(12) United States Patent
Chau et al.

(10) Patent No.: US 10,929,486 B1
(45) Date of Patent: Feb. 23, 2021

(54) ACTIVITY ASSISTANT

(71) Applicant: Google LLC, Mountain View, CA (US)

(72) Inventors: Stephen Chau, Palo Alto, CA (US); Andrew Timothy Szybalski, San Francisco, CA (US); Stephane Lafon, Sunnyvale, CA (US); Andrea Lynn Frome, Oakland, CA (US); Jerry Howard Morrison, Mountain View, CA (US); Derek King Prothro, San Mateo, CA (US); Huy Tuan Nguyen, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 365 days.

(21) Appl. No.: 15/791,284

(22) Filed: Oct. 23, 2017

Related U.S. Application Data

(63) Continuation of application No. 14/813,056, filed on Jul. 29, 2015, now Pat. No. 9,798,817, which is a continuation of application No. 13/333,990, filed on Dec. 21, 2011, now Pat. No. 9,098,606.

(60) Provisional application No. 61/425,711, filed on Dec. 21, 2010.

(51) Int. Cl.
| | | |
|---|---|---|
| *G06F 16/00* | (2019.01) | |
| *G06F 16/9535* | (2019.01) | |
| *G06F 3/0484* | (2013.01) | |
| *G06F 16/248* | (2019.01) | |
| *G06F 16/2457* | (2019.01) | |

(52) U.S. Cl.
CPC ...... *G06F 16/9535* (2019.01); *G06F 3/04842* (2013.01); *G06F 16/248* (2019.01); *G06F 16/24575* (2019.01); *G06F 16/24578* (2019.01)

(58) Field of Classification Search
CPC .......... G06F 16/9535; G06F 16/24575; G06F 16/24578; G06F 16/248; G06F 3/0482; G06F 17/30699; G06F 17/30035; G06F 17/30867
See application file for complete search history.

(56) References Cited

U.S. PATENT DOCUMENTS

| | | |
|---|---|---|
| 7,212,922 B1 | 5/2007 | Longacre et al. |
| 7,336,964 B2 | 2/2008 | Casey |
| 7,383,130 B1 * | 6/2008 | Koosam ................. G01W 1/00 702/3 |
| 8,315,953 B1 | 11/2012 | Hansen et al. |
| 8,423,557 B2 | 4/2013 | Li et al. |

(Continued)

*Primary Examiner* — Mohammed R Uddin
(74) *Attorney, Agent, or Firm* — Lowenstein Sandler LLP

(57) ABSTRACT

Disclosed herein are methods and systems that relate to an "activity assistant" that provides users with dynamically-selected "activities" that are intelligently tailored to the user's world. The subject technology receives the one or more global parameters of one or more selected activities. The subject technology further receives the one or more account-specific parameters of a selected user account. For the selected user account, and for each of the one or more selected activities, the subject technology: (a) determines one or more signals based at least in part on one or more of the global parameters of the selected activity and one or more of the account-specific parameters of the selected user account, and (b) uses the determined signals as a basis for determining an importance of the selected activity for the selected user.

20 Claims, 5 Drawing Sheets

(56) References Cited

U.S. PATENT DOCUMENTS

| | | |
|---|---|---|
| 8,468,201 B2 | 6/2013 | Dasilva et al. |
| 9,235,848 B1 | 1/2016 | Gourley et al. |
| 2003/0126250 A1 | 7/2003 | Jhanji |
| 2006/0058948 A1 | 3/2006 | Blass et al. |
| 2007/0078729 A1 | 4/2007 | Brown |
| 2007/0192277 A1 | 8/2007 | Jackson |
| 2007/0233736 A1 | 10/2007 | Xiong et al. |
| 2007/0266133 A1 | 11/2007 | Bukovec et al. |
| 2007/0300225 A1 | 12/2007 | Macbeth et al. |
| 2008/0046298 A1 | 2/2008 | Ben-Yehuda et al. |
| 2008/0301188 A1 | 12/2008 | OHara |
| 2009/0077000 A1 | 3/2009 | Begole et al. |
| 2009/0077057 A1 | 3/2009 | Ducheneaut et al. |
| 2009/0152349 A1 | 6/2009 | Bonev et al. |
| 2009/0307003 A1 | 12/2009 | Benyamin et al. |
| 2010/0082376 A1 | 4/2010 | Levitt |
| 2011/0040756 A1* | 2/2011 | Jones ............... G06F 16/951 707/737 |
| 2011/0125678 A1 | 5/2011 | Partridge |
| 2011/0183645 A1 | 7/2011 | Chawla |
| 2011/0270517 A1* | 11/2011 | Benedetti ............ G01C 21/20 701/533 |
| 2011/0276565 A1 | 11/2011 | Zheng et al. |
| 2012/0095976 A1* | 4/2012 | Hebenthal .......... G06F 16/9535 707/706 |

\* cited by examiner

ACTIVITY ASSISTANT

CROSS-REFERENCE TO RELATED APPLICATIONS

The present application claims the benefit of priority under 35 U.S.C. § 120 as a continuation of U.S. patent application Ser. No. 14/813,056 titled, "ACTIVITY ASSISTANT," filed Jul. 29, 2015, which claims the benefit of priority under 35 U.S.C. § 120 as a continuation of U.S. patent application Ser. No. 13/333,990 entitled "ACTIVITY ASSISTANT," filed on Dec. 21, 2011, now U.S. Pat. No. 9,098,606, which claims the benefit of priority under 35 U.S.C. § 119 from U.S. Provisional Patent Application Ser. No. 61/425,711 entitled "ACTIVITY ASSISTANT," filed on Dec. 21, 2010, the disclosures of which are hereby incorporated by reference in their entirety for all purposes.

BACKGROUND

Unless otherwise indicated herein, the materials described in this section are not admitted to be prior art by inclusion in this section.

Various technologies can be utilized to electronically exchange information between users. For example, computers, telephones, and personal digital assistants (PDAs) can be used to exchange content over communication networks including the Internet. The content exchanged between such devices can include web pages that, in turn, can include text, video data, audio data and/or other types of data.

SUMMARY

Disclosed herein are configurations of the subject technology that relate to an "activity assistant" that provides users with dynamically-selected "activities" that are intelligently tailored to the user's world. Accordingly, an example activity assistant may customize display of a user's activity list, suggest activities, and customize activity search results based on personalized factors such as the user's interests, current mood, and intent. Furthermore, an example activity assistant may also be capable of intelligently varying the behavior of a given activity from one user to another, depending upon the characteristics of a given user. For example, the activity assistant may score an activity based not only on the characteristics of the activity itself, but also based on data that is indicative of the user's "context" (e.g., the user's, interests, intents, moods, experiences, etc.).

According to an example embodiment, a user interface may also be provided that allows for intuitive user interaction with activities via the activity assistant. This user interface may be generally referred to herein as an "activity assistant user interface". A user typically accesses the activity assistant UI by logging in to a user's activity-assistant account. According to an example embodiment, the activity assistant UI displays graphical representations of activities to a user in a logical manner that varies according to the interests, intents, and moods of the user. Via the activity assistant UI, the user may view activities they have added to a personal "activity list," view suggested activities, create and add new activities to their activity list, and/or add/delete existing activities (i.e. those created by other users) to/from their activity list, among other functions.

In one aspect, an example method performed by a computing device may involve: (i) from a global activity database that comprises data defining a plurality of activities, wherein the data for each activity comprises one or more global parameters, retrieving the one or more global parameters of one or more selected activities, (ii) from a user-account database that includes data for each of a plurality of user accounts, wherein the data for a given one of the user accounts: (a) comprises one or more account-specific parameters, and (b) identifies any of the plurality of activities that are associated with the given account, retrieving the one or more account-specific parameters of a selected user account, (iii) for the selected user account, and for each of the one or more selected activities: (a) determining one or more signals based at least in part on one or more of the global parameters of the selected activity and one or more of the account-specific parameters of the selected user account, wherein each signal provides an indication of importance of the selected activity to the selected user account; and (b) using the determined signals as a basis for determining an importance of the selected activity for the selected user; and (iv) causing a graphical display to display the one or more selected activities in an arrangement that is based at least in part on to the importance of the selected activities relevant to one another.

In another aspect, an example activity-assistant system may include: (i) a global activity database comprising data that defines a plurality of activities, wherein the data for each activity comprises one or more global parameters; (ii) a user-account database comprising data for each of a plurality of user accounts, wherein the data for a given one of the user accounts: (a) comprises one or more account-specific parameters, and (b) identifies any of the plurality of activities that are associated with the given account; and (iii) one or more servers communicatively coupled to the global activity database and the user-account database, wherein the one or more servers are configured, for a selected user account, to: for each of one or more selected activities: (a) determine one or more signals based at least in part on one or more of the global parameters of the selected activity and one or more of the account-specific parameters of the selected user account, wherein each signal that are indicative of importance of the selected activity to the selected user account, and (b) use the determined signals as a basis to determine a score for the selected activity. Further, the one or more servers may be configured to cause a graphical display to display the one or more selected activities in an arrangement that is based at least in part on to the scores of the selected activities relevant to one another.

In yet another aspect, an article of manufacture including a non-transitory computer-readable medium is disclosed. Program instructions may be stored thereon that, upon execution by a computing device, cause the computing device to perform operations comprising: (i) accessing and retrieving data from a global activity database that comprises data defining a plurality of activities, wherein the data for each activity comprises one or more global parameters. (ii) accessing and retrieving data from a user-account database that comprises data for each of a plurality of user accounts, wherein the data for a given one of the user accounts: (a) comprises one or more account-specific parameters, and (b) identifies any of the plurality of activities that are associated with the given account; (iii) for a selected user account, and for each of one or more selected activities: (a) determining one or more signals based at least in part on one or more of the global parameters of the selected activity and one or more of the account-specific parameters of the selected user account, wherein each signal that are indicative of importance of the selected activity to the selected user account, and (b) using the determined signals as a basis for determining a score for the selected activity; and (iv) causing a graphical display to display the one or more selected activities in an arrangement that is based at least in part on to the scores of the selected activities relevant to one another.

DETAILED DESCRIPTION

Figure 1:
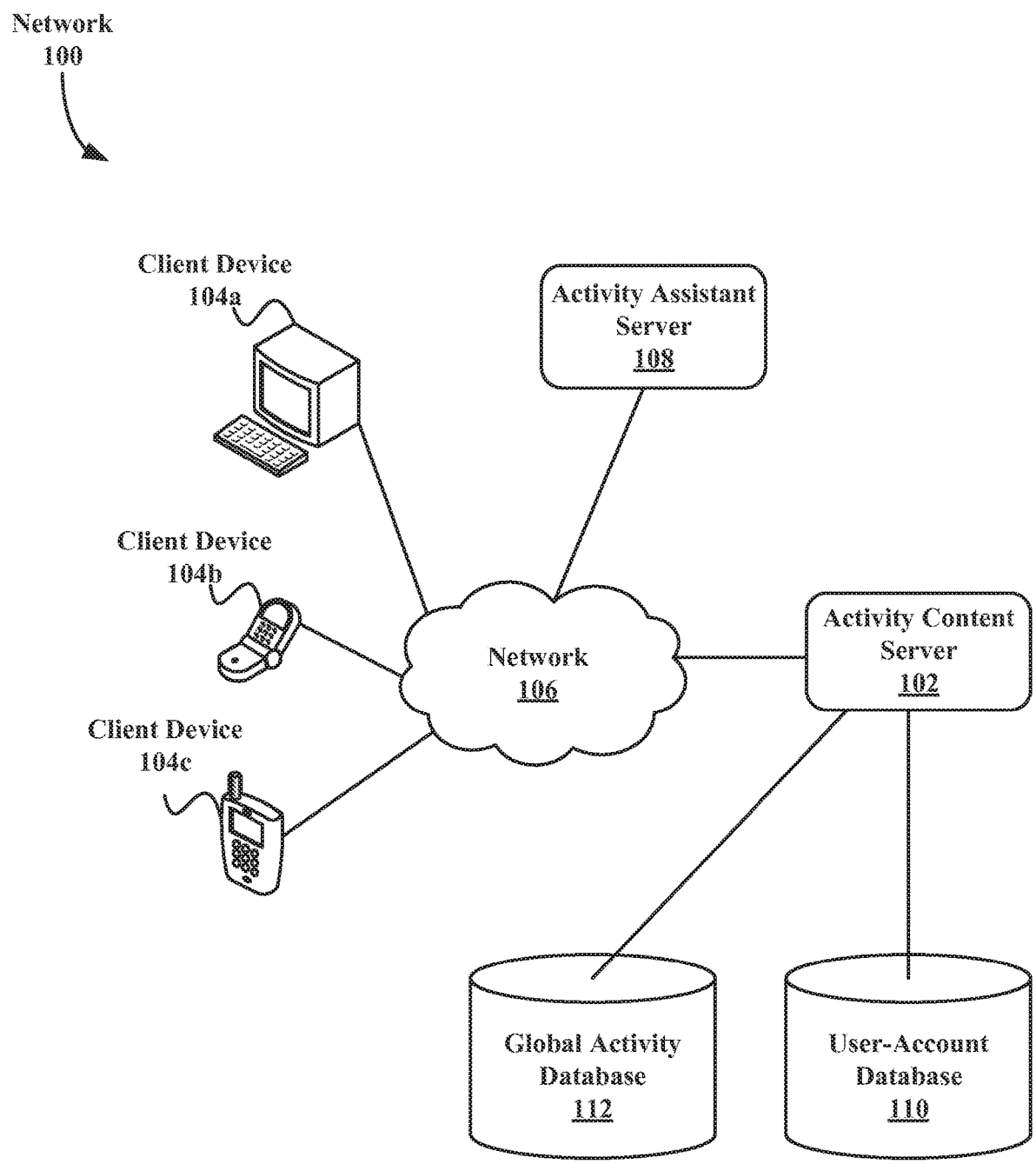
FIG. 1 depicts a network in accordance with an example embodiment.

The following detailed description describes various features and functions of the example systems, devices, and methods with reference to the accompanying figures. It should be understood that the word "example" is used herein to mean "serving as an example, instance, or illustration." Any embodiment described herein as "example" is not necessarily to be construed as preferred or advantageous over other embodiments. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

An "activity", as used herein, can be a data construct describing a thing to do, which a user can associate with a user's "activity-assistant account." In an example embodiment, an activity is defined at least in part by one or more singular, global activity parameters. For example, global parameters for a given activity may include: (a) a title or text description (e.g., "get brunch at Boogaloo's restaurant"), (b) data indicating the location that is associated with the activity (e.g., the latitude/longitude and/or the address of Boogaloo's restaurant), (c) data indicating one or more user "moods" that may be indicative of the activity being more or less well-suited for a given user (e.g., "fun", "social", "cerebral", "productive". "ambitious", etc.), (d) data indicating time constraints on the activity (e.g., the hours Boogaloo's restaurant is open and/or the hours during which Boogaloo's restaurant serves brunch), and/or (e) any other data that may be directly or indirectly interpreted to affect the importance of a given activity to a given user. Further, an activity can be doable at multiple locations (e.g., "Eat a hamburger" or "Go river rafting").

Generally, an activity is a user-defined construct, and thus the global parameters that define each activity may vary. In particular, a given activity may or may not include all of the above-mentioned global activity parameters. For example, a user may create an activity that is not tied to any particular location (e.g., "do homework for math class"), and thus choose not to provide a location. Furthermore, as activities are flexible and dynamic constructs, it should be understood that the above-mentioned examples of global parameters are not limiting. It is also possible that an activity may be generated by a computing system without any initial user input (or alternatively, generated based on some user-provided input).

Once an activity is created, however, its global parameters apply to all users who add the activity. Thus, in effect, there is a single copy of each activity and its global parameters that is common all users that have access to the activity. It should be understood, however, that global parameters can still be flexible and dynamic; changing over time in relation to the activity. For example, a "popularity" parameter may be defined for an activity that is updated on an ongoing basis to reflect the number of users that have added the activity.

To further allow for customization of activities to a particular user, "user-specific" parameters, which vary between users, may be defined for an activity. Accordingly, while the global parameters of an activity are the same for all users, each user that adds an activity may customize their user-specific parameters for the activity. For instance, user-specific parameters may be used to specify: (a) plans regarding the activity (e.g., "I want to do it". "I want to do it again, but not for a few weeks," "I must do it before December 25." "I never want to do it again," etc.), (b) the user's history regarding that scheme (e.g., I went there with Lauren on November 4 and again with Ryan on November 28). (c) personal time constraints based on user preferences (e.g., preference of brunch early on Sunday so she has time to digest before her yoga class at noon or preference of brunch around noon because he usually stays out late on the weekends), and/or (d) any other personal preferences related to, and "overrides" or modifications of, the global parameters (e.g., "I like to go to Boogaloo's restaurant when I'm depressed because it cheers me up," "I like to go to Boogaloo's restaurant when I have friends in town," etc.).

In a further aspect, an activity may be designated as a "public" or "private" activity. Depending on how a given activity is defined, this designation may be made by setting a global parameter when the activity is created (and thus apply to all users who add the activity), and/or may be made via a user-specific parameter that is settable by each user who adds an activity.

An activity that is designated as "public" via a global parameter may be viewable (and thus addable) to all users, whereas an activity that is designated as "private" via a global parameter may only be viewable to the creator of the activity. In an example embodiment, a global parameter may be set to designate an activity as a "private shared" activity, in which case the activity may only be viewable by the author and the users the author specifies. Further, the fact that a given activity is designated as "public," "private," or "private shared" via a global parameter may be interpreted as a signal relevant to the importance of the activity to a certain user.

When an activity is designated as "private" via a user-specific parameter, other users are generally not notified that the user has added the activity. And when an activity is designated as "public" via a user-specific parameter, other users may be notified and/or be able to see that the user has added the activity. Further, when an activity is designated as "public" via a user-specific parameter, the user may be able to define which other users can view and/or which other users should be notified that they have added the activity.

In an example embodiment, an "activity assistant" is provided, which is configured to evaluate the relative importance of activities to a particular user so that activities can be presented on the activity assistant user interface in a logical manner. In particular, the activity assistant may score an activity based not only on the characteristics of the activity itself, but also based on data that is indicative of the user's "context" (e.g., the user's, interests, intents, moods, experiences, associations with other users, etc.). With the support of the activity assistant, the activity assistant user interface may therefore provide users with a dynamic and flexible mechanism for deciding what activities they might enjoy, and how they would like to spend their time.

In order to quantify the importance of a particular activity for a particular user, the activity assistant may identify and/or determine any number of "signals" that may be directly or indirectly relevant to the importance of an activity to the particular user. From the perspective of the activity assistant, signals may take the form of information provided by global parameters and user-specific parameters taken individually or information determined by evaluating interactions between global parameters, user-specific parameters, and/or other data sources. The activity assistant may evaluate the signals for a particular user in combination with a particular activity, the activity assistant may quantify the importance of the particular activity for the particular user (e.g., by assigning a "score" to the activity).

To provide some examples of such signals, they may include but are not limited to: (a) the level of similarity between user's mood and activity mood. (b) the level of similarity between the user's context (as indicated by user-specific signals and/or user-specific parameters indicating, for example, whether the user is on a desktop computer/mobile phone, on-line/off-line, talking on the phone, driving, walking, etc.) and corresponding activity context requirements and/or restrictions (as indicated by global parameters of the activity), (c) distance between user's location and activity location (if available). (d) appropriateness of current weather at user's location and/or activity's location for the activity (e.g., rainy, sunny, snowy, etc.), (e) user-designated priority for the activity, (f) user-designated due date (or next due date, if recurring), (f) snooze history or pattern for the activity, (g) amount of time required for the activity. (h) progress or status of the activity (done, active, in-progress, etc.). (i) ownership of the activity (e.g., whether the owner is the particular user in question or another user), (j) whether the user received a heads-up. (k) popularity of the activity (e.g., number of comments on an activity, or the number of people who have commented, copied, liked, shared, done, or followed the activity), (l) similarity between user query string and activity text (for search/suggest), (m) similarity between user query string and names or e-mails of other users in the activity (for search/suggest), (n) similarity between user query string and activity comment text (for search/suggest), and (o) whether the user indicated another user with whom to participate in the activity with.

Supported with this intelligence from the activity assistant, the activity assistant user interface may present activities that a particular user has associated with their account in a logical order that is based at least in part upon the relative importance of the activities to the user. In particular, the activity assistant may evaluate the signals for each activity in a user's activity list (e.g., each activity that has been added by the user) and assign a score to the activity. The activity assistant can then rank the activities in the user's activity list according to their respectively determined score, and relay this information to the activity assistant user interface so that it can adjust the displayed activity list accordingly.

Further, the intelligence of the activity assistant may be utilized to provide "suggested" activities that are tailored to the particular user's preferences, tendencies, location, time table, associated other users, and/or mood at a given point in time. In particular, the activity assistant may initiate an activity search that takes into account the scores of activities when ranking the search results, and these search results may be presented to the user via the activity assistant user interface. In a similar manner, the activity assistant may support an "activity search" feature of the activity assistant user interface. This feature may allow the user to enter text and initiate an activity search on the text, the results of which factor in the relative scores of activities as assessed by the activity assistant.

In some examples, when a certain available activity exceeds a certain relevance threshold for a user's current context, the activity assistant sends a "push" notification (or "alert") to a given user's computing device (e.g., mobile phone, etc.). By way of example, the user has indicated that the user needs to buy a mother's day present via a given activity, the user is passing a location where this activity can be done, and the current date is the day before mother's day. This example would utilize the scoring function as in the above described activity list, but an activity would have to pass a higher threshold in order to generate a notification.

According to an example embodiment, a user interface is provided that allows for intuitive user interaction with such activities. This user interface may be generally referred to herein as an "activity assistant user interface." A user typically accesses the activity assistant user interface by logging in to a user's activity-assistant account. According to an example embodiment, the activity assistant user interface displays graphical representations of activities to a user in a logical manner that varies according to the interests, intents, associations with other users, and moods of the user. Via the activity assistant user interface, the user may view activities they have added to a personal "activity list," view suggested activities, create and add new activities to their activity list, and/or add/delete existing activities (e.g., those created by other users) to/from their activity list, among other functions.

Turning to the figures. FIG. 1 depicts a network in accordance with an example embodiment. In network 100, activity assistant server 108 and possibly activity content server 102 are configured to communicate, via a network 106, with client devices 104a, 104b, and 104c. As shown in FIG. 1, client devices can include a personal computer 104a, a telephone 104b, and a smart-phone 104c. More generally, the client devices 104a, 104b, and 104c (or any additional client devices) can be any sort of computing device, such as an ordinary laptop computer, desktop computer, network terminal, wireless communication device (e.g., a cell phone or smart phone), and so on.

The network 106 can correspond to a local area network, a wide area network, a corporate intranet, the public Internet, combinations thereof, or any other type of network(s) configured to provide communication between networked computing devices. Activity content server 102 can provide content to client device 104a-104c and/or activity assistant server 108. The content can include, but is not limited to, web pages, hypertext, scripts, binary data such as compiled software, images, audio, and/or video. The content can include compressed and/or uncompressed content and/or encrypted and/or unencrypted content. Other types of content are possible as well.

In an alternative arrangement, activity assistant server 108 and activity content server 102 can be co-located and/or combined as a common server. Further, it also possible that activity assistant server 108 and/or activity content server 102 can be accessible via a network separate from the network 106. Yet further, although FIG. 1 only shows three client devices, activity assistant server 108 and/or activity content server 102 can serve any number of client devices (from a single client device to hundreds, thousands, or even more client devices).

Global activity database 112 typically includes activity data that defines a plurality of activities. In particular, the activity data for each activity may include one or more global activity parameters that collectively define the global context for the activity. Further, user-account database 110 may include data for users' activity accounts. This data may include, for a given one of the accounts, data indicating user-specific parameters and signals. Further, for a given activity account, the data may include an indication of which activities, if any, are associated with the account (e.g., the activities that a user has added to their activity list).

According to an example embodiment, activity assistant server 108 embodies the "activity assistant" and thus is configured to provide the activity-assistant functionality described herein. In particular, activity assistant server 108 may be configured to identify signals relating to the importance of a particular activity to a particular user (e.g., relating to a given user-activity pair), so that activities can be logically displayed to a user, suggested to a user, and/or searched for a user via an activity assistant user interface.

In some embodiments, activity-assistant functionality described herein may also be performed by software on the device such as, but not limited to, devices 104a, 104b, and 104c as shown in FIG. 1. For example, the client software running on the device such as, but not limited to, devices 104a, 104b, and 104c as shown in FIG. 1 may perform all or some portion of the ranking functionality and/or provide more advanced assistance, e.g. by providing a latitude/longitude and/or map for an address entered by the user via an activity assistant user interface and/or by directly communicating with an activity assistant processing system.

The activity assistant server 108 may acquire the data from which signals are determined, and/or data directly providing signals, from a number of different data sources. For example, activity content server 102 may provide activity assistant server 108 with access to global activity database 112 and user-account database 110. Thus, when evaluating the importance of a particular activity to a particular user, activity assistant server 108 may retrieve the global parameters of the activity from global activity database 112, as well as user-specific parameters from user-account database 110.

Figure 2A:
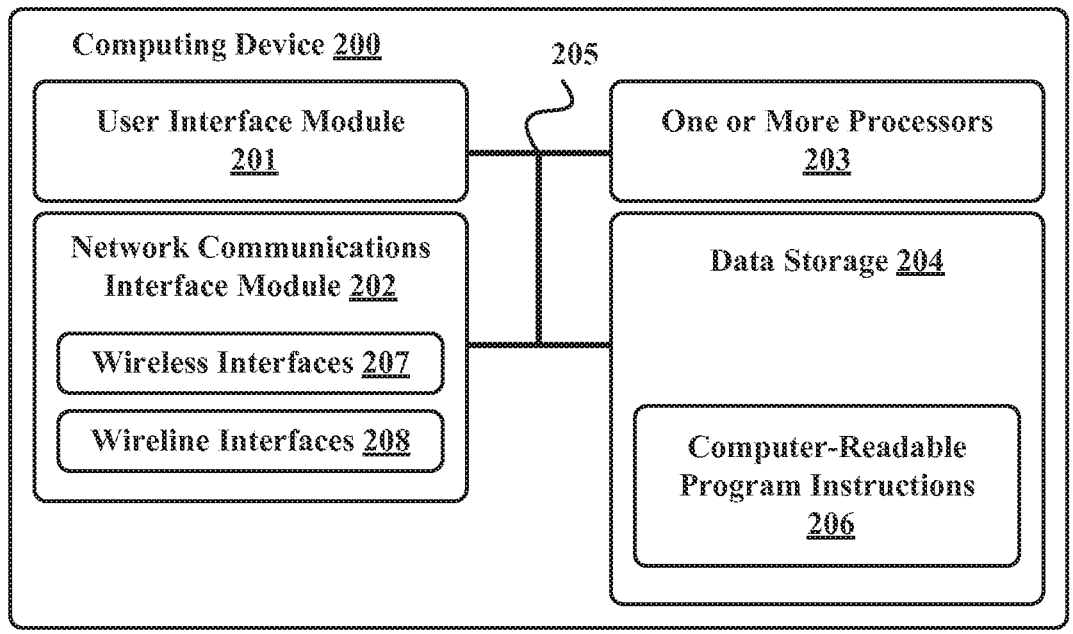
FIG. 2A is a block diagram of a computing device in accordance with an example embodiment.

FIG. 2A is a block diagram of a computing device in accordance with an example embodiment. Computing device 200 can be configured to perform one or more functions of client devices 104a, 104b, and 104c, activity assistant server 108, and/or activity content server 102. The computing device 200 can include a user interface module 201, a network-communication interface module 202, one or more processors 203, and/or data storage 204, all of which can be linked together via a system bus, network, or other connection mechanism 205.

The user interface module 201 can be operable to send data to and/or receive data from external user input/output devices. For example, the user interface module 201 can be configured to send/receive data to/from user input devices such as a keyboard, a keypad, a touch screen, a computer mouse, a track ball, a joystick, a microphone, and/or other similar devices, now known or later developed. The user interface module 201 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 201 can also be configured to receive audible input(s) via the microphone (or similar audio input device) and/or generate audible output(s), such as a speaker, speaker jack, audio output port, audio output device, earphones, and/or other similar devices, now known or later developed.

The network-communications interface module 202 can include one or more wireless interfaces 207 and/or wireline interfaces 208 that are configurable to communicate via a network, such as the network 106 shown in FIG. 1. The wireless interfaces 207 can include one or more wireless transceivers, such as a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other types of wireless transceivers configurable to communicate via a wireless network. The wireline interfaces 208 can include one or more wireline transceivers, such as an Ethernet transceiver, a Universal Serial Bus (USB) transceiver, or similar transceiver configurable to communicate via a wire, a twisted pair of wires, a coaxial cable, an optical link, a fiber-optic link, or other physical connection to a wireline network.

In some embodiments, the network communications interface module 202 can be configured to provide reliable, secured, compressed, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be compressed and decompressed using one or more compression and/or decompression algorithms and/or protocols such as, but not limited to, one or more lossless data compression algorithms and/or one or more lossy data compression algorithms. Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

The one or more processors 203 can include one or more general purpose processors and/or one or more special purpose processors (e.g., digital signal processors, application specific integrated circuits, etc.). The one or more processors 203 can be configured to execute computer-readable program instructions 206 that are contained in the data storage 204 and/or other instructions as described herein.

The data storage 204 can include one or more computer-readable storage media that can be read or accessed by at least one of the processors 203. The one or more computer-readable storage media can include volatile and/or non-volatile storage components, such as optical, magnetic, organic or other memory or disc storage, which can be integrated in whole or in part with at least one of the one or more processors 203. In some embodiments, the data storage 204 can be implemented using a single physical device (e.g., one optical, magnetic, organic or other memory or disc storage unit), while in other embodiments, the data storage 204 can be implemented using two or more physical devices.

Computer-readable storage media associated with data storage 204 and/or other computer-readable media described herein can also include non-transitory computer-readable media such as computer-readable media that stores data for short periods of time like register memory, processor cache, and random access memory (RAM). Computer-readable storage media associated with data storage 204 and/or other computer-readable media described herein can also include non-transitory computer readable media that stores program code and/or data for longer periods of time, such as secondary or persistent long term storage, like read only memory (ROM), optical or magnetic disks, compact-disc read only memory (CD-ROM), for example. Computer-readable storage media associated with data storage 204 and/or other computer-readable media described herein can also be any other volatile or non-volatile storage systems. Computer-readable storage media associated with data storage 204 and/or other computer-readable media described herein can be considered computer readable storage media for example, or a tangible storage device.

The data storage 204 can include computer-readable program instructions 206 and perhaps additional data. In some embodiments, the data storage 204 can additionally include storage required to perform at least part of the herein-described techniques, methods (e.g., methods 700 and 800), and/or at least part of the functionality of the herein-described devices and networks.

Figure 2B:
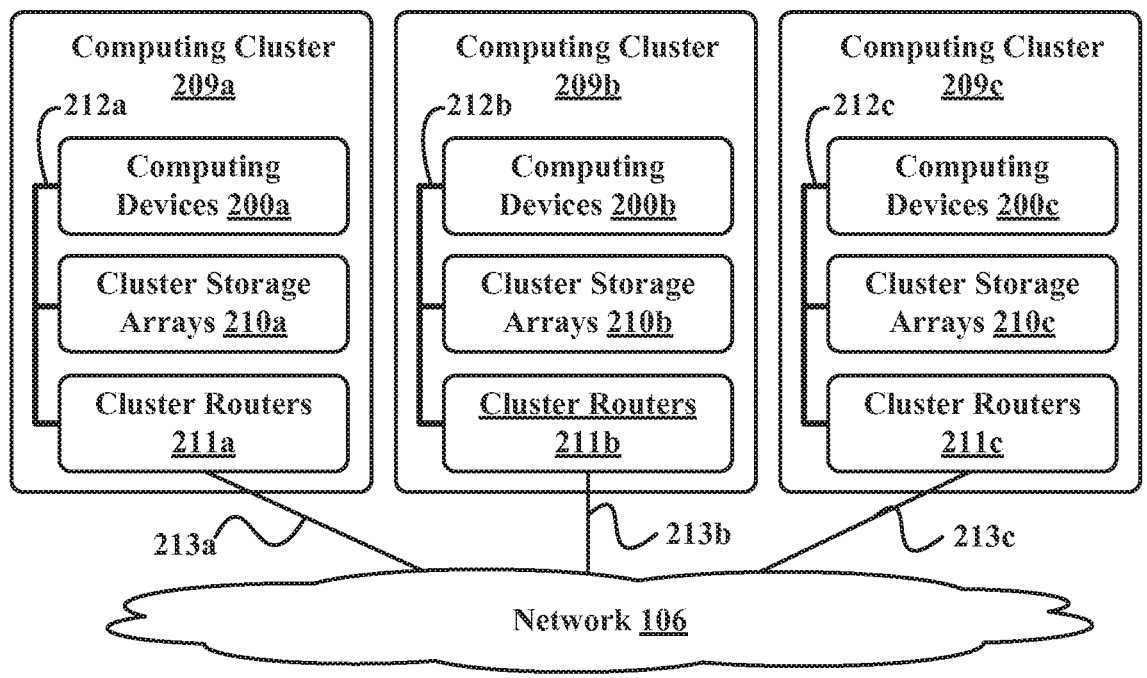
FIG. 2B depicts a network with computing clusters in accordance with an example embodiment.

FIG. 2B depicts a network with computing clusters in accordance with an example embodiment. In FIG. 2B, functions of activity assistant server 108 and/or activity content server 110 can be distributed among three computing clusters 209a, 209b, and 208c. The computing cluster 209a can include one or more computing devices 200a, cluster storage arrays 210a, and cluster routers 211a connected by local cluster network 212a. Similarly, computing cluster 209b can include one or more computing devices 200b, cluster storage arrays 210b and cluster routers 211b connected by local cluster network 212b. Likewise, computing cluster 209c can include one or more computing devices 200c, cluster storage arrays 210c, and cluster routers 211c connected by a local cluster network 212c.

In some embodiments, each of computing clusters 209a, 209b, and 209c can have an equal number of computing devices, an equal number of cluster storage arrays, and an equal number of cluster routers. In other embodiments, however, some or all of computing clusters 209a, 209b, and 209c can have different numbers of computing devices, different numbers of cluster storage arrays, and/or different numbers of cluster routers. The number of computing devices, cluster storage arrays, and cluster routers in each computing cluster can depend on the computing task or tasks assigned to each computing cluster.

In computing cluster 209a, for example, computing devices 200a can be configured to perform various computing tasks of activity content server 102. In one embodiment, the various functionalities of activity content server 102 can be distributed among one or more of the computing devices 200a. For example, some of these computing devices can be configured to provide part or all of a first set of content while the remaining computing devices can provide part or all of a second set of content. Still other computing devices of the computing cluster 209a can be configured to communicate with activity assistant server 108. Computing devices 200b and 200c in computing clusters 209b and 209c can be configured the same or similarly to the computing devices 200a in computing cluster 209a.

On the other hand, in some embodiments, computing devices 200a, 200b, and 200c each can be configured to perform different functions. For example, computing devices 200a and 200b can be configured to perform one or more functions of activity content server 102, and the computing devices 200c can be configured to perform one or more functions of activity assistant server 108.

Cluster storage arrays 210a, 210b, and 210c of computing clusters 209a, 209b, and 209c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of activity assistant server 108 and/or activity content server 102 can be distributed across computing devices 200a. 200b, and 200c of respective computing clusters 209a, 209b, and 209c, various active portions and/or backup/redundant portions of these components can be distributed across cluster storage arrays 210a, 210b, and 210c. For example, some cluster storage arrays can be configured to store data for activity assistant server 108, while other cluster storage arrays can store data for activity content server 102. Additionally, some cluster storage arrays can be configured to store backup versions of data stored in other cluster storage arrays.

The cluster routers 211a, 211b, and 211c in the computing clusters 209a, 209b, and 209c can include networking equipment configured to provide internal and external communications for the computing clusters. For example, the cluster routers 211a in the computing cluster 209a can include one or more internet switching and/or routing devices configured to provide (i) local area network communications between the computing devices 200a and the cluster storage arrays 201a via the local cluster network 212a, and/or (ii) wide area network communications between the computing cluster 209a and the computing clusters 209b and 209c via the wide area network connection 213a to the network 106. The cluster routers 211b and 211c can include network equipment similar to the cluster routers 211a, and the cluster routers 211b and 211e can perform similar networking functions for the computing clusters 209b and 209b that the cluster routers 211a perform for the computing cluster 209a.

In some embodiments, computing tasks and stored data associated with activity assistant server 108 and/or activity content server 102 can be distributed across the computing devices 200a, 200b, and 200c based at least in part on the processing requirements for functions of activity assistant server 108 and/or user account server 102, the processing capabilities of the computing devices 200a, 200b, and 200c, the latency of the local cluster networks 212a, 212b, and 212c and/or of the wide area network connections 213a, 213b, and 213c, and/or other factors that can contribute to the cost, speed, fault-tolerance, resiliency, efficiency, and/or other design goals of the overall system architecture.

Additionally, the configuration of the cluster routers 211a, 211b, and 211e can be based at least in part on the data communication requirements of the computing devices and cluster storage arrays, the data communications capabilities of the network equipment in the cluster routers 211a. 211b, and 211c, the latency and throughput of the local cluster networks 212a, 212b, 212c, the latency, throughput, and cost of the wide area network connections 213a, 213b, and 213c, and/or other factors that can contribute to the cost, speed, fault-tolerance, resiliency, efficiency and/or other design goals of the system architecture.

Figure 3A:
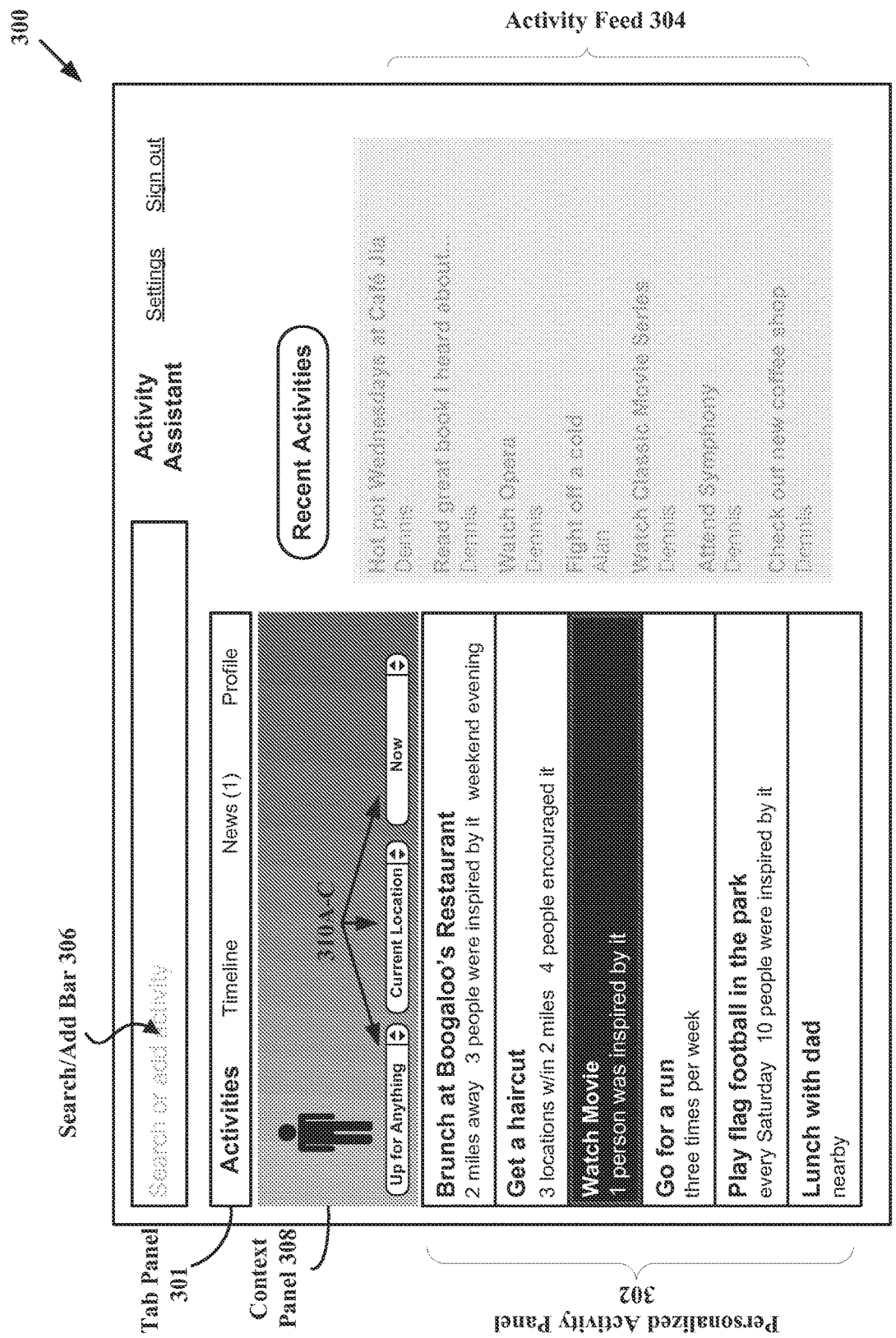
FIG. 3A is a block diagram illustrating features of a user interface, according to an example embodiment.

FIG. 3A is a block diagram illustrating features of a user interface, according to an example embodiment. In particular, activity-assistant user interface 300 may be displayed via a client device once a user has logged in to their activity-assistant account, and may allow a user to interact with an activity assistant. While only one screen of the activity-assistant user interface 300 is shown, it should be understood that the activity-assistant user interface may include other screens, which provide additional functionality, without departing from the scope of the invention. As shown, activity-assistant user interface 300 includes a personalized activity panel 302, an activity feed 304 that displays activities that have been added, done, and/or recently updated by friends of the user (or members of the user's social graph and/or social network), a search/add bar 306, and a context panel 308. Further, context panel 308 includes a number of input mechanisms 310 A-C via which a user can input context signals.

The context panel 308 provides an interactive mechanism for users to provide context signal data that describes a "user context" (e.g. to provide signals indicative of the user's intent, interest, mood, state-of-mind, experience, perception, associations with other users, etc.). In the illustrated example, input mechanism 310A on the left of context panel 308 allows a user to signal their mood (e.g., "up for anything", "lazy", "productive", "social", etc.). The input mechanism 310B in the center of context panel 308 allows a user to signal a location (e.g., "current location", "home". "work", "stadium", etc.). Further, input mechanism 310C on the right of context panel 308 allows a user to signal a time or timeframe (e.g., "now". "tomorrow", "tonight", "next Wednesday morning", "2:00 AM CST", "9:00 PM EST on Saturday", etc.). Other input mechanisms are possible as well.

While the context information provided via the input mechanisms of the context panel 308 may be referred to as "signals" from the user, it should be understood that, programmatically, this information may take the form of user-specific parameters that are associated with the user's activity account. As such, the data provided via input mechanisms 310 A-C may be stored in a user-account database. For example, referring back to FIG. 1, data from input mechanisms 310 A-C may be stored as user-specific parameters in user-account database 110. It is also possible that activity assistant server 108 may be fed data or may pull data directly from input mechanisms 310 in real-time.

The context signal data acquired from the context panel 308 (e.g., user-specific parameters related to "user context") may be combined by the activity assistant (e.g., activity-assistant server 108 and/or activity content server 102) with global parameters of a given activity, other user-specific parameters, and/or data from other sources, in order to derive signals indicative of activity-importance of the given activity to the user. In this context, the "signals" are the information relative to the importance of the activity that is derived from the data (e.g., the user-specific parameters, global parameters, etc.). As such, the activity assistant may interpret a user-parameter as a signal in and of itself.

For instance, the user's mood (provided via input mechanism 310A) may be interpreted as a signal that makes any number of activities more or less important for the user. As a specific example, if the user's mood is "lazy", the activity "watching a movie" may become more important than it otherwise would be (as global parameters may indicate that "lazy" is a mood associated with the "watching a movie" activity). On the other hand, the activity "go to the gym" may become less important than it otherwise would be (as global parameters of "watching a movie" do not typically include "lazy" as an associated mood, or may in fact indicate that "lazy" is a mood that is likely incompatible with this activity).

The activity assistant may also derive more complex signals by evaluating the relationships and/or interactions between user-specific parameters, global parameters, and/or other data items. To provide an example, a user may have provided a "love being outdoors" signal, which may be stored in the user's account as a user-specific parameter (note that a user interface input mechanism not shown on the screen 300, but is contemplated as being available). At a given point in time, the user also may have set their mood to "active" via input mechanism 310A, set their location to "current location" via input mechanism 310B, and set their time to "tomorrow afternoon". The activity assistant may interpret this data as including a signal that the user would like to do something active tomorrow afternoon at the same place they are currently located.

Further, the activity assistant may use other data sources to determine other relevant signals, such as the weather forecast for the next day at the user's current location or the location that the user will likely be at the next day. Tomorrow afternoon's weather forecast may thus be a signal, which can be combined with the signal derived from the user-specific parameters to provide a more-refined signal that, for example, outdoor fitness or sporting activities near the user's location should always be favored over indoor fitness or sporting activities near the user's location, unless the tomorrow afternoon's forecast is for rain, in which case the amount by which outdoor activities are favored over indoor activities may be reduced (or indoor activities may actually be favored). For instance, combining all of this information, the activity assistant may increase the importance of active outdoor activities (e.g., "go for a run", "play flag football", etc.) to a greater extent when the forecast is for sunny weather, than when the forecast is for rain or snow.

The activity assistant may apply signal-based techniques, such as those described herein, to assess activity-importance for a number of activities and the importance of these activities relative to one another. This technique may be employed to provide the user with various functions that are tailored to the user's context.

For example, personalized activity panel 302 may display intelligently selected and ordered activities from a pool of activities including the activities a user has added to their account and suggested activities that have been selected for a user. For example, a number of suggested activities may be determined based on factors such as user preferences, signals from the context panel, global parameters of potential activities, activities that have been added and/or done by friends of the user, and/or activities that have been added and/or done by the user in the past, among others. These suggested activities may then be combined with the activities a user has already added to create a pool of potential activities for the personalized activity panel 302. Then, to determine which specific activities to display in personalized activity panel 302, the activity assistant may quantify the importance of each activity (e.g., by evaluating signals for each activity), so that the activities that are most important to the user are displayed.

Note that personalized activity panel 302 may visually differentiate between activities that a user has already added to their account, and suggested activities. For example, the "Watch Movie" activity is displayed with a dark background and white text to indicate that it is a suggested activity (and that the user may thus wish to add it), whereas the other activities listed in personalized activity panel 302 all have a white background with black text, thus indicating that the user has already added these activities.

Further, the evaluation of importance may also be applied in the process of determining which activities should be displayed in the activity feed 304 (and possibly the order in which those activities are displayed). In particular, a certain number of the most recently-added and updated activities may be evaluated based on signals such as those described above, and the most important of the recent activities may be displayed (possibly in the order of importance. Alternatively, it should be understood that activity feed 304 may simply display activities in a time-wise manner as they are added/updated/completed, without adjusting based on the user's context. In a similar manner, search results (not shown) for an activity search via search/add bar 306 may be displayed based at least in part on importance of the activities located in the search, or may simply be displayed in an order according to one of the many well-known search techniques.

Figure 3B:
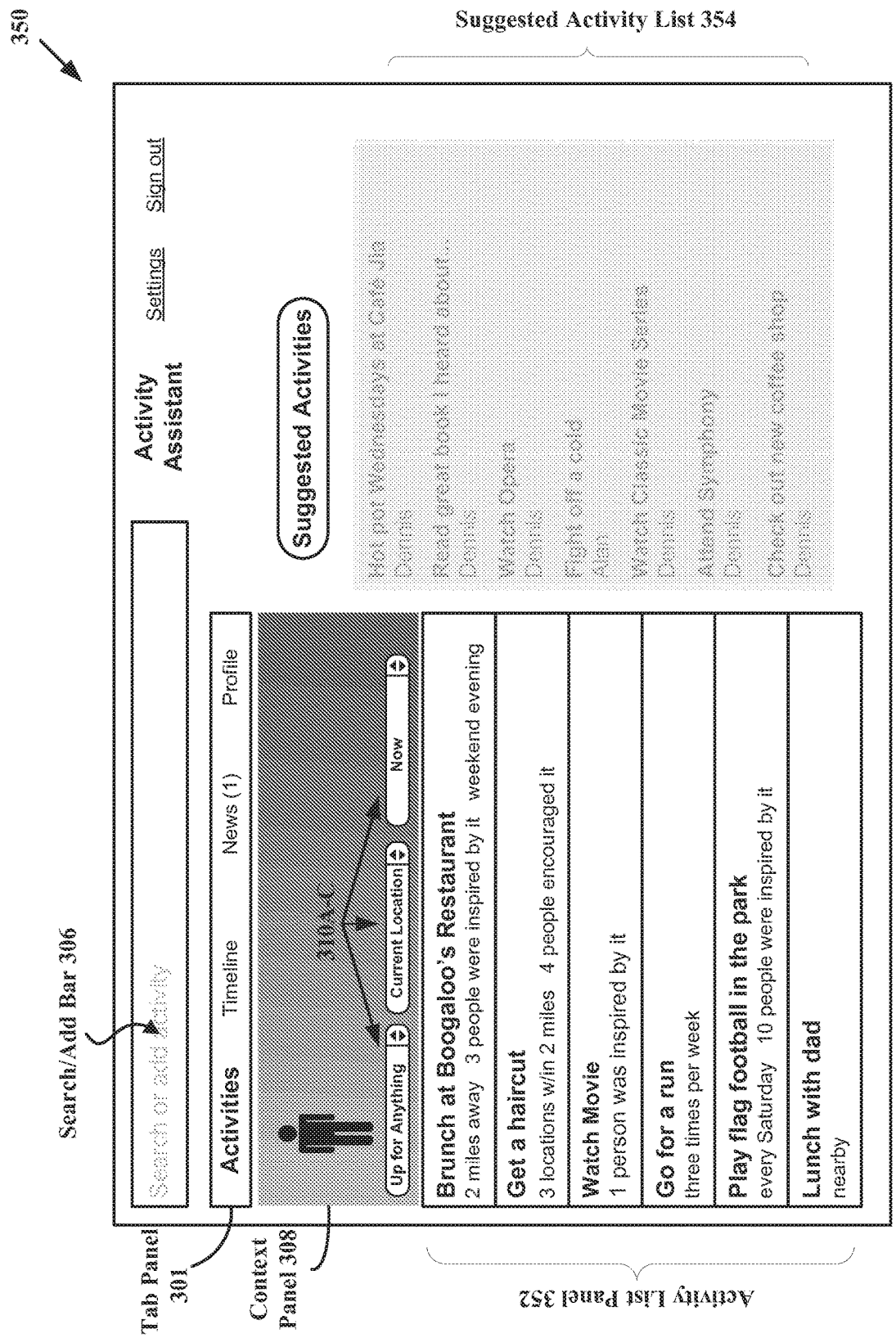
FIG. 3B is another block diagram illustrating features of a user interface, according to an example embodiment.

FIG. 3B is another block diagram illustrating features of a user interface, according to an example embodiment. In particular. FIG. 3B illustrates an alternative activity-assistant user interface 350, which may be displayed via a client device once a user has logged in to their activity-assistant account. Activity-assistant user interface 350 includes some of the same UI elements as activity-assistant user interface 300 of FIG. 3A (e.g., search/add bar 306 and context panel 308 including a number of input mechanisms 310 A-C). However, activity-assistant user interface 350 includes an activity list 352 and a suggested activity list 354.

In this embodiment, activity list 352 may include only activities that a user has added to their account. Thus, by evaluating signals for each activity a user has added to their account, the activity assistant can determine which activities should be displayed in activity list 352 (and the order in which those activities should be displayed).

Furthermore, suggested activity list 354 may display only suggested activities (which have not yet been added by the user.) Accordingly, the importance of specific activities may also be a factor in the process of determining which activities should be displayed in the suggested activity list 354 (and the order of those activities).

Figure 4:
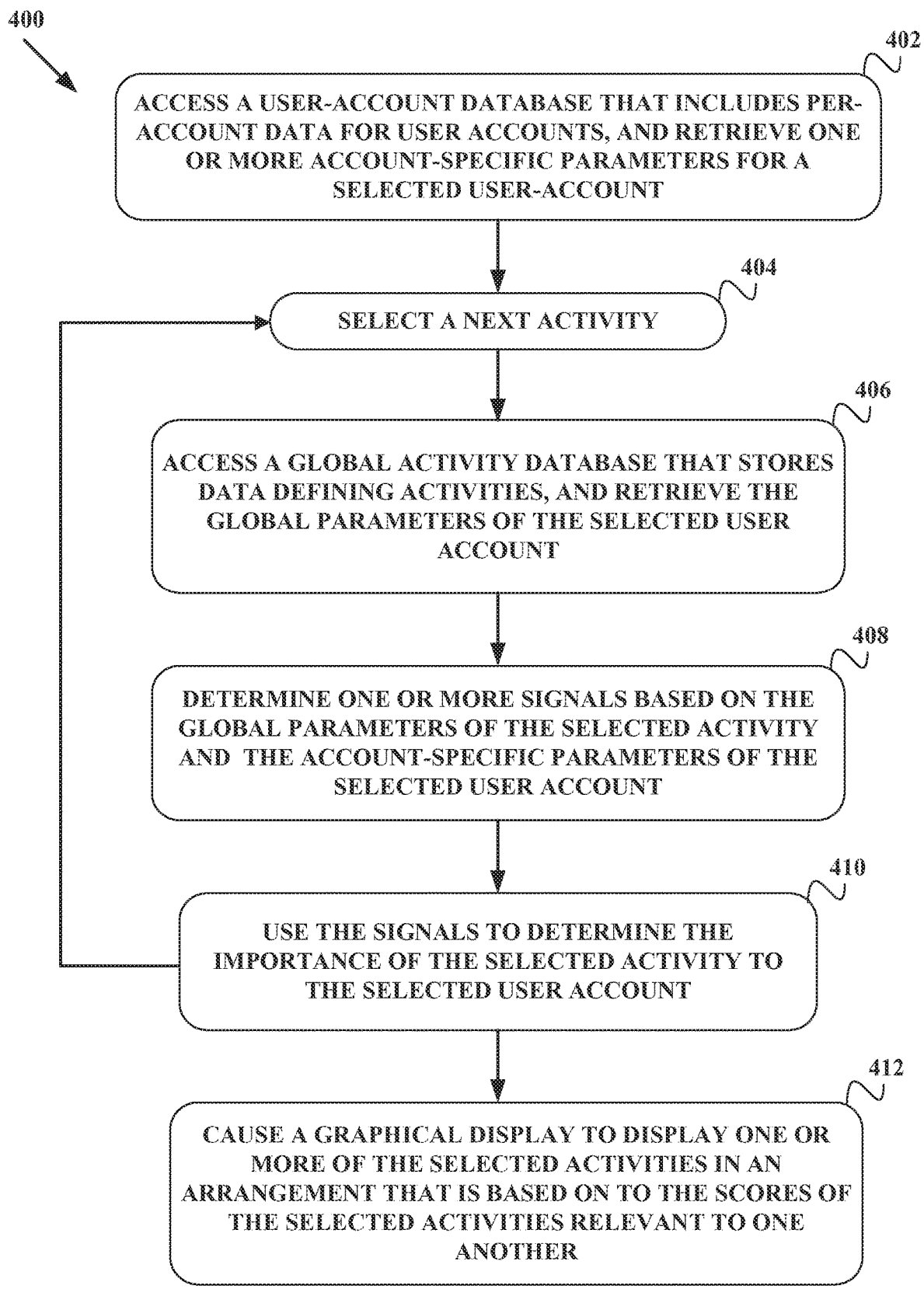
FIG. 4 is flow chart illustrating a method according to an example embodiment.

FIG. 4 is flow chart illustrating a method according to an example embodiment. In particular, method 400 may be carried out by an activity assistant in order to facilitate dynamic and flexible and activities. For example, activity assistant server 108 and/or user account server 102 of FIG. 1 carries out a method such as method 400 to facilitate dynamic user interaction with activities via an interface such as the activity-assistant user interfaces of FIGS. 3A and 3B in some configurations.

More specifically, method 400 involves the activity assistant accessing a user-account database and retrieving the one or more account-specific parameters of a selected user account, as shown by block 402. The activity assistant then selects a next activity, as shown by block 404, and accesses a global activity database to retrieve the global parameters of a selected activity, as shown by block 406. Then, for the combination of the selected user account and the selected activity, the activity assistant determines one or more signals based at least in part on the global parameters of the selected activity and the account-specific parameters of the selected user account, as shown by block 408. Also as shown by block 408, each signal provides an indication as to the importance of the selected activity to the selected user account. Accordingly, the activity assistant can then use the determined signals as a basis for determining the importance of the selected activity for the selected user, as shown by block 410. The activity assistant then causes a graphical display to display one or more of the selected activities in an arrangement that is based at least in part on to the importance of the selected activities relevant to one another in some configurations.

With respect to any or all of the block diagrams and flow charts in the figures as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or message may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

It should be understood that for situations in which the systems and methods discussed herein collect personal information about users, the users may be provided with an opportunity to opt in/out of programs or features that may collect personal information (e.g., information about a user's preferences or a user's contributions to social content providers). In addition, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A method performed by a computing device, the method comprising:
    receiving one or more account-specific parameters of a selected user account from a user-account database comprising data for a plurality of user accounts;
    determining, based on one or more factors including the one or more account-specific parameters, potential activities from a global activity database comprising data defining a plurality of activities, wherein the data for the plurality of activities comprises one or more global parameters, and wherein one or more of the potential activities are provided by corresponding user accounts of the plurality of user accounts of an activity-assistant system that are different from the selected user account;
    for each of the potential activities:
        determining one or more signals based at least in part on the one or more global parameters of the potential activity and the one or more account-specific parameters of the selected user account; and
        determining a score of the potential activity for the selected user account based on the determined one or more signals; and
    providing for display one or more suggested activities from the potential activities based on the score of each of the potential activities.

2. The method of claim 1, wherein the one or more suggested activities provided for display are ordered by the corresponding score.

3. The method of claim 1, wherein the receiving the one or more account-specific parameters of the selected user account comprises acquiring, via an interactive context panel displayed on the computing device, user input comprising at least one of a current user mood, a planned user location, or a planned user timeframe.

4. The method of claim 1, further comprising:
    sending a push notification to a user computing device associated with the selected user account in response to the determined score of at least one of the one or more suggested activities exceeding a relevance threshold.

5. The method of claim 1, wherein the one or more potential activities have been designated as viewable to the selected user account by the corresponding user accounts associated with users of the activity-assistant system.

6. The method of claim 1, wherein the determining the one or more signals of the potential activity is based on a similarity between a particular parameter of the one or more global parameters and an associated parameter of the one or more account-specific parameters of the selected user account.

7. The method of claim 1, wherein the one or more signals include an indication that the potential activity has been added by another user account of the plurality of user accounts, wherein the one or more account-specific parameters indicate that the other user account is associated with the selected user account.

8. The method of claim 1, wherein the one or more signals include an indication that the potential activity has been previously done by the selected user account or by another user account of the plurality of user accounts associated with the selected user account.

9. The method of claim 1, wherein the one or more global parameters of the potential activity include a context requirement comprising at least one of a compatible mood, an activity location, or an activity timeframe.

10. The method of claim 1, wherein the one or more signals include a popularity of the potential activity based on interactions by the plurality of user accounts with respect to the potential activity.

11. A computer-based activity-assistant system comprising:
    a global activity database comprising data that defines a plurality of activities, wherein the data for the plurality of activities comprises one or more global parameters;
    a user-account database comprising data for a plurality of user accounts; and
    one or more servers, each including at least one processor, communicatively coupled to the global activity database and the user-account database, wherein the one or more servers are configured, for a selected user account, to:
        receive one or more account-specific parameters of the selected user account from the user-account database;
        determine, based on one or more factors including the one or more account-specific parameters, potential activities from the global activity database, wherein one or more of the potential activities are provided by corresponding user accounts of the plurality of user accounts of the activity-assistant system that are different from the selected user account;
        for each of the potential activities:
            determine one or more signals based at least in part on the one or more global parameters of the potential activity and the one or more account-specific parameters of the selected user account; and
            determine a score of the potential activity for the selected user account based on the determined one or more signals; and
        provide for display one or more suggested activities from the potential activities based on the score of each of the potential activities.

12. The system of claim 11, wherein the one or more servers are configured to provide for display the one or more suggested activities by providing a list of the one or more suggested activities ordered by the corresponding score.

13. The system of claim 11, wherein the one or more servers are configured to receive the one or more account-specific parameters of the selected user account by acquiring, via an interactive context panel displayed on a display device, user input comprising at least one of a current user mood, a planned user location, or a planned user timeframe.

14. The system of claim 11, wherein the one or more servers are further configured to:
    send a push notification to a user computing device associated with the selected user account in response to the determined score of at least one of the one or more suggested activities exceeding a relevance threshold.

15. The system of claim 11, wherein the one or more potential activities have been designated as viewable to the selected user account by the corresponding user accounts associated with users of the activity-assistant system.

16. A non-transitory computer-readable medium comprising instructions that, responsive to execution by a computing device, cause the computing device to perform operations comprising:

retrieving one or more account-specific parameters of a selected user account from a user-account database comprising data for a plurality of user accounts;

determining, based on one or more factors including the one or more account-specific parameters, potential activities from a global activity database comprising data defining a plurality of activities, wherein the data of the plurality of activities comprises one or more global parameters, wherein the one or more global parameters includes a parameter for designating an activity as one of a public activity, a private activity and a private shared activity, and wherein one or more of the potential activities are provided by corresponding user accounts of an activity-assistant system that are different from the selected user account;

for each of the potential activities:
    determining one or more signals based at least in part on the one or more global parameters of the potential activity and the one or more account-specific parameters of the selected user account; and
    determining a score of the potential activity for the selected user account based on the determined one or more signals; and providing for display one or more suggested activities from the potential activities based on the score of each of the potential activities.

17. The non-transitory computer-readable medium of claim 16, wherein the one or more suggested activities provided for display are ordered by the corresponding score.

18. The non-transitory computer-readable medium of claim 16, wherein retrieving the one or more account specific parameters of the selected user account comprises acquiring, via an interactive context panel displayed on the computing device, user input comprising at least one of a current user mood, a planned user location, or a planned user timeframe.

19. The non-transitory computer-readable medium of claim 16, wherein the instructions further cause the computing device to perform the operations comprising:

sending a push notification to a user computing device associated with the selected user account in response to the determined score of at least one of the one or more suggested activities exceeding a relevance threshold.

20. The non-transitory computer-readable medium of claim 16, wherein the one or more potential activities have been designated as viewable to the selected user account by the corresponding user accounts associated with users of the activity-assistant system.

* * * * *